No. 759,894. PATENTED MAY 17, 1904.
P. D. LAWLOR.
TELLURIAN.
APPLICATION FILED AUG. 20, 1903.
NO MODEL. 3 SHEETS—SHEET 2.

Witnesses
Inventor
P. D. Lawlor
By R. S. & A. B. Lacey, Attorneys.

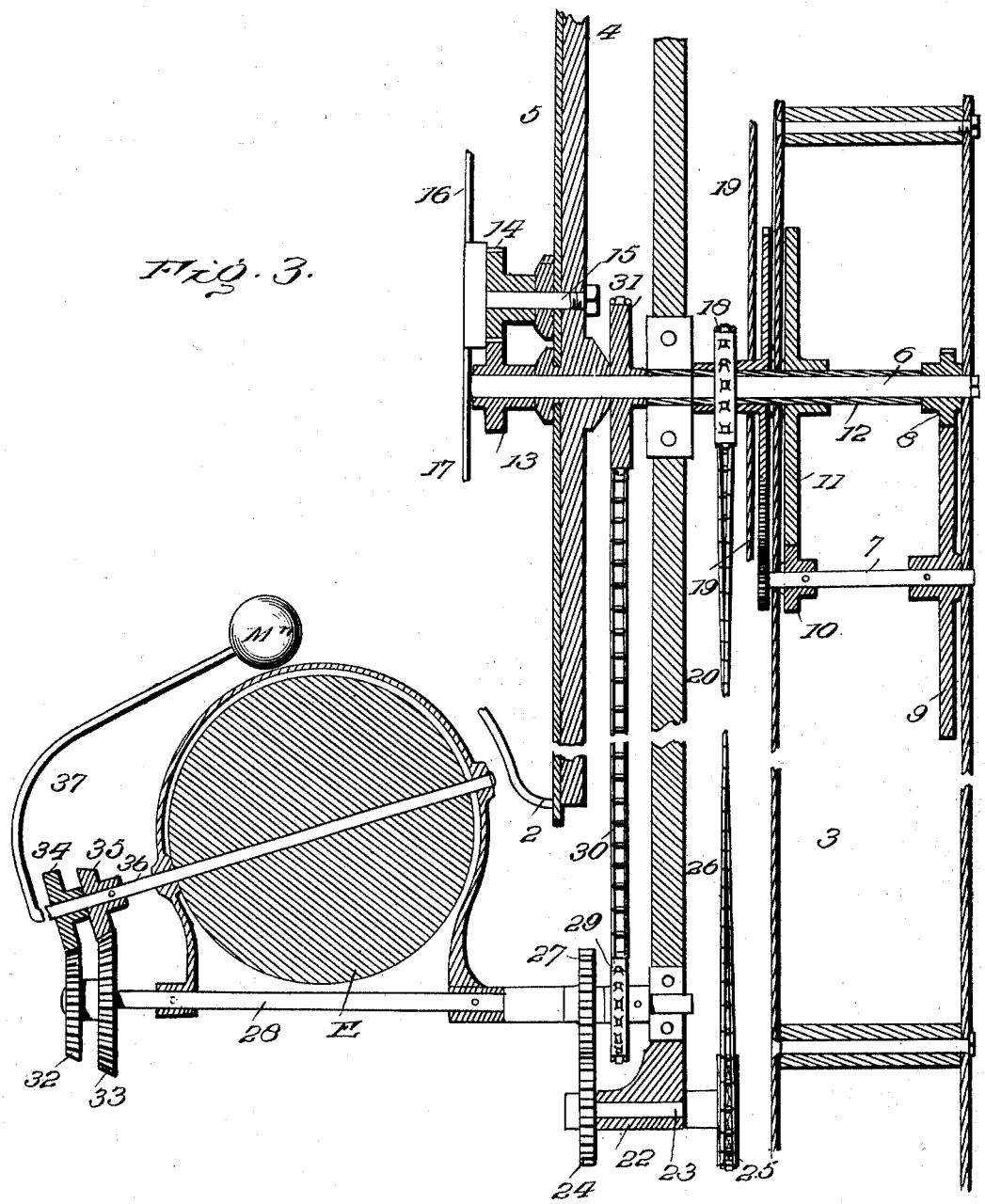

No. 759,894.                                                          Patented May 17, 1904.

UNITED STATES PATENT OFFICE.

PATRICK D. LAWLOR, OF CARATUNK, MAINE.

TELLURIAN.

SPECIFICATION forming part of Letters Patent No. 759,894, dated May 17, 1904.

Application filed August 20, 1903. Serial No. 170,195. (No model.)

*To all whom it may concern:*

Be it known that I, PATRICK D. LAWLOR, a subject of the King of Great Britain, residing at Caratunk, in the county of Somerset and State of Maine, have invented certain new and useful Improvements in Tellurians, of which the following is a specification.

This invention has relation to apparatus for mechanically illustrating the phenomena of night and day, the seasons of the year, the phases of the moon, the earth's orbit, the equation of time, and other terrestrial and celestial occurrences.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
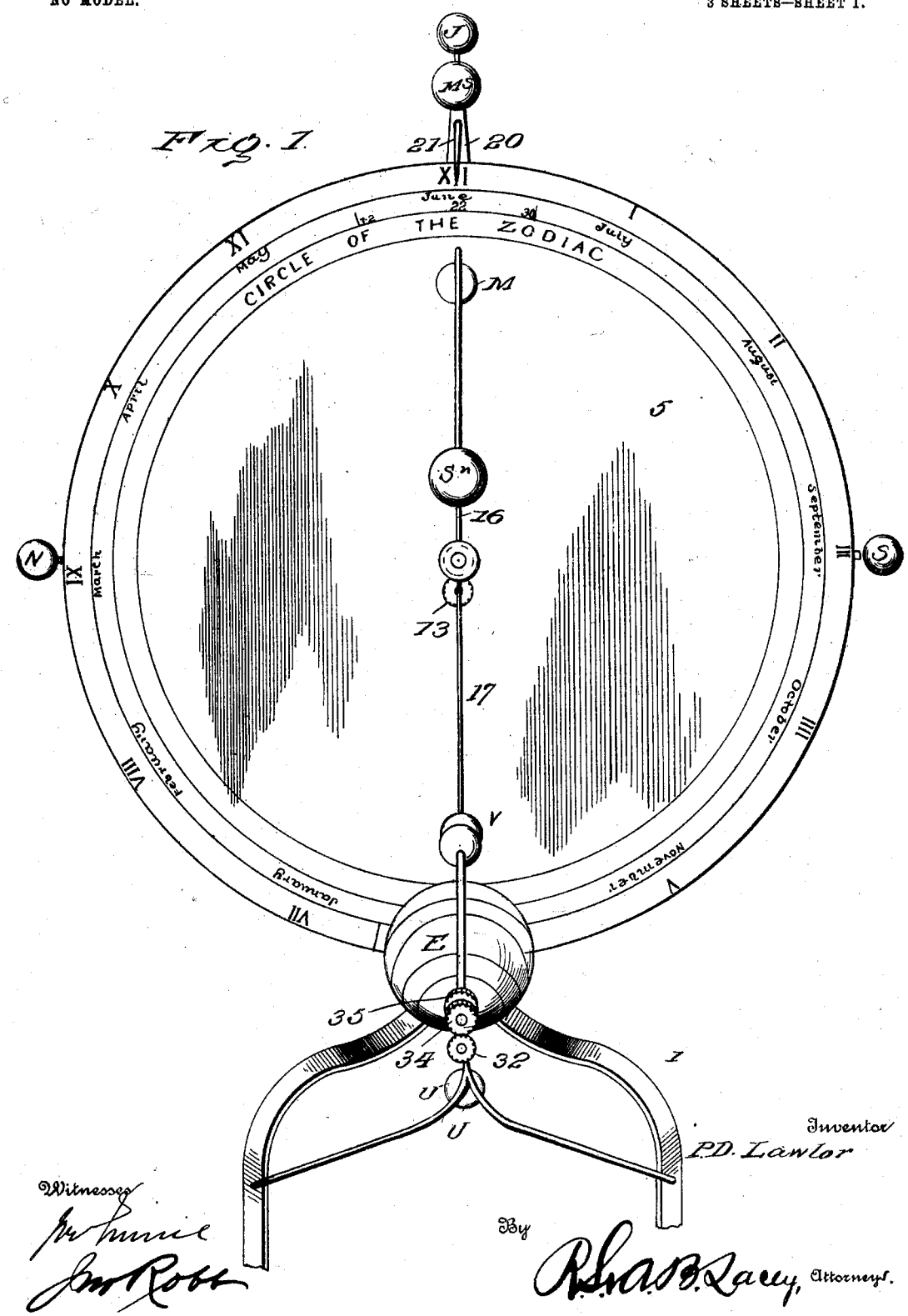
Figure 2:
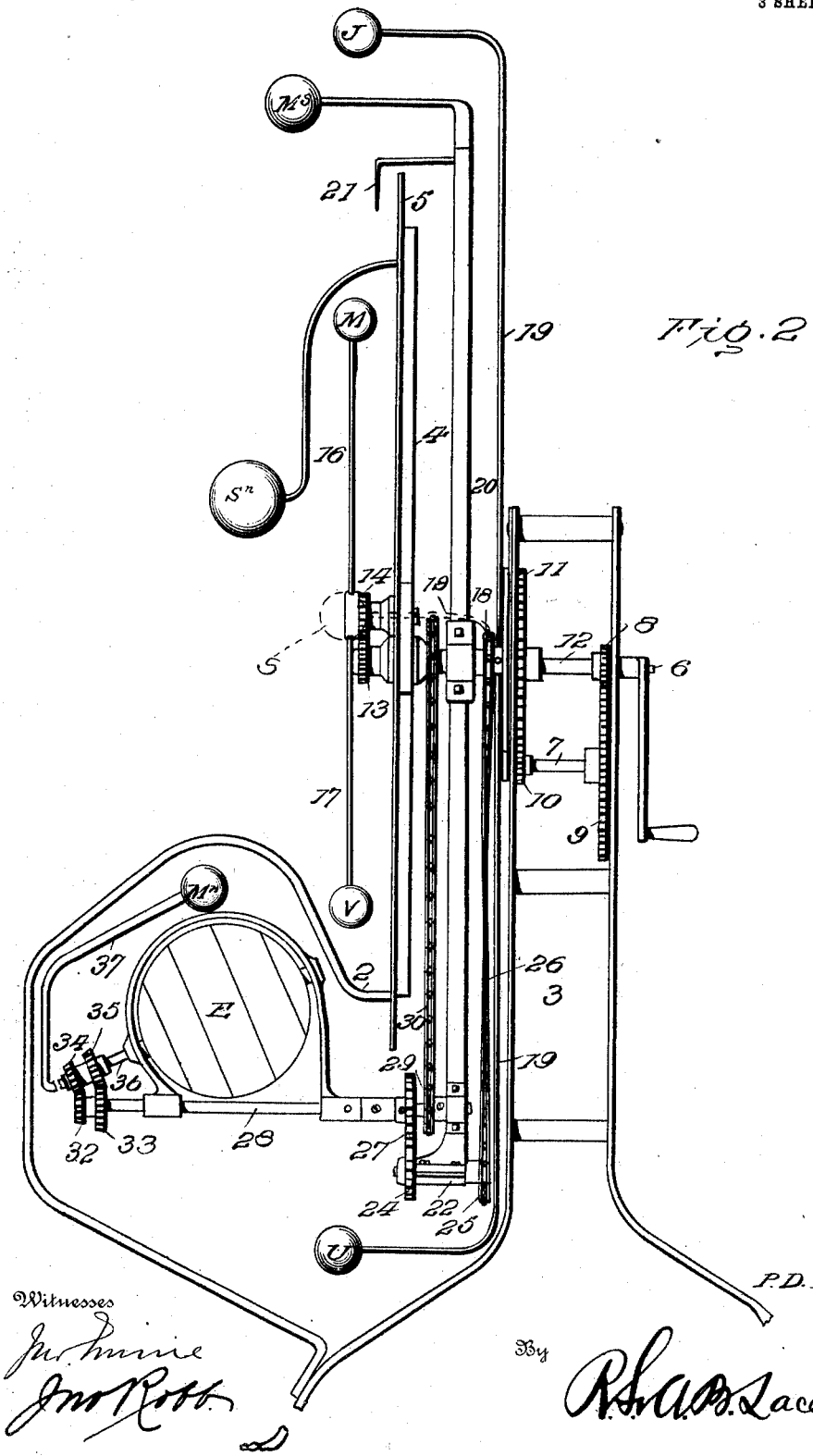

Figure 1 is a front view of a tellurian embodying the invention. Fig. 2 is a side elevation thereof, showing the planet-globe Saturn and its supporting-arm in dotted lines. Fig. 3 is a vertical central section of the tellurian on a larger scale, parts being broken away.

Corresponding and like parts are referred to in the following description and indicated in all the views of the drawings by the same reference characters.

Within the purview of the invention the apparatus may be arranged in any desired plane and the mountings for the operating parts may be of any construction, according to the size and cost of the apparatus and the number of globes embodied in its organization.

For the sake of illustration the apparatus is shown in its simplest form and vertically disposed, the framework comprising a stand 1 and frames 2 and 3, the latter receiving the operating-gearing and the former supporting the plate 4, to which the planisphere 5 is attached. The planisphere 5 is a plate or disk having inscribed thereon the signs of the zodiac, the names of the calendar months, the Roman characters, from "I" to "XII," inclusive, representing the hours of the day as commonly depicted upon the dial of a clock or like timepiece, and any other matter desired to be called to attention. This planisphere and its support 4 are stationary.

The operating-gearing comprises the operating-shaft 6, companion shaft 7, pinion 8, secured to shaft 6 and in mesh with the gear-wheel 9, secured to the shaft 7, and pinion 10, secured to the opposite end portion of shaft 7 and in mesh with gear-wheel 11, secured to sleeve 12, loosely mounted upon the operating-shaft 6. The shaft 6 projects beyond the support 4 and planisphere 5 and has gear-wheel 13 secured thereto, which in turn is in mesh with companion gear-wheel 14, loosely mounted upon the journal 15, projected from the support 4 and set to one side of the shaft 6. Arms 16 and 17 project radially from the gear-wheel 14 and are provided at their outer ends with globes M and V, representing the planets Mercury and Venus. These arms 16 and 17 may be of any relative length to approximate the proportionate distances of said planets from each other and from the sun and the earth. A sprocket-gear 18 is loosely mounted upon the sleeve 12 and has a comparatively slow rotary movement imparted thereto, corresponding approximately to the travel of the planets around the sun, and arms 19 are secured at their inner ends to the sprocket-gear 18 and extend outward therefrom to a point beyond the planisphere and the earth's orbit and are provided at their outer ends with globes J, S, U, and N, representing, respectively, the planets Jupiter, Saturn, Uranus, and Neptune. These arms 19 may be of any determinate length to approximate the varying distances of the said planets from the earth. The arms 16 and 17 are considerably shorter than the arms 19, since the planets Mercury and Venus travel within the earth's orbit, whereas the planets represented by the globes attached to the arms 19 travel outside of the earth's orbit. An arm 20 is secured to the sleeve 12, so as to turn therewith, and is provided upon one end with a globe M*s*, representing the planet Mars, and upon its opposite end with a globe E, indicating the earth, the globe M*s* being preferably of sufficient weight to counterbalance the parts applied to the opposite end of the arm 20, so that the apparatus may operate easily. A pointer 21 is attached to the end of the arm 20 adjacent to the globe Ms and extends over the planisphere to indicate any matter thereon corresponding to the relative position of the earth with reference to the sun or other planets of the constellation.

A bearing 22 is provided at the end of the arm 20 opposite to that carrying the planet-globe Ms and receives the shaft 23, to the opposite ends of which are attached, respectively, gear-wheel 24 and sprocket-gear 25, the latter being connected by sprocket-chain 26 with the sprocket-gear 18. The gear-wheel 24 is in mesh with a companion gear-wheel 27, secured to shaft 28, carried by the arm 20 and supporting the earth and moon globes and their operating-gearing. A sprocket-gear 29 is mounted upon the shaft 28 and is connected by sprocket-chain 30 with a sprocket-gear 31, secured to the power-driven shaft 6. Bevel gear-wheels 32 and 33 are provided at the outer end of the shaft 28 and are in mesh with, respectively, the gear-wheels 34 and 35, the latter being connected with the axis 36 of the earth-globe E and the former having an arm 37 connected therewith and carrying the moon-globe Mn. The intermeshing gears 32 and 34 and 33 and 35 are separate and independent and rotate at different speeds, whereby the globes Mn and E rotate at a variable speed corresponding to the planets which they represent.

Rotary motion being imparted to shaft 6, the gear elements 13, 31, and 8 rotate in unison therewith and the sleeve 12, loosely mounted upon said shaft 6, is driven at a considerably slower speed by reason of the gearing 8, 9, 10, and 11. Hence the arm 20 and sprocket-gear 18 rotate at a much slower speed than the elements 13 and 31. The gearing is so proportioned that in one revolution of the arm 20 the earth-globe E makes three hundred and sixty-five revolutions about its axis, corresponding to the number of days and nights of a calendar year. The globe Sn indicates the sun, the center of the solar system, and is arranged to one side of a prolongation of the shaft 6, whereby the orbit of the earth is eccentric to the sun, so as to represent the phenomena of the seasons in conjunction with the inclination of the axis of the earth to the ecliptic. By inscribing the hours and minutes upon the planisphere to correspond to the dial of a clock or timepiece and imparting a regular movement to the shaft 6 by means of a spring or weight, as in an ordinary clock-movement, the apparatus may be utilized as a timepiece, as will be readily comprehended.

Having thus described the invention, what is claimed as new is—

1. In a tellurian, the combination of a drive-shaft, a sleeve concentric with the drive-shaft, gearing connecting the sleeve and drive-shaft for causing the two to rotate at different relative speeds, an arm secured to said sleeve and provided with a shaft carrying the earth-globe, a second shaft journaled to said arm, a sprocket-gear loosely mounted upon the said sleeve and connected to the second shaft mounted in said arm, globe-carrying arms attached to the sprocket-gear loosely mounted upon said sleeve, and gearing between the said drive-shaft and the earth-carrying shaft, substantially as specified.

2. In a tellurian, the combination of a shaft and a sleeve concentrically mounted and adapted to be driven at different rates of speed, a gear-wheel in mesh with a companion gear secured to said shaft, planet-carrying arms attached to said gear-wheel, an arm attached to the said sleeve, a shaft journaled to said arm and geared to the drive-shaft, an earth-globe carried by the shaft attached to the said arm, and gearing between the earth-globe and said shaft, substantially as described.

3. In a tellurian, the combination of a drive-shaft, a sleeve concentric therewith, gearing connecting the drive-shaft and sleeve for rotating them at different relative speeds, an arm secured to said sleeve, a shaft journaled to one end of said arm and provided with an earth-globe, gearing connecting said shaft with the drive-shaft, other gearing between the earth-globe-carrying shaft and the aforementioned sleeve, and a planet-globe at the opposite end of said arm to that carrying the earth-globe and serving as a counterbalance, substantially as set forth.

In testimony whereof I affix my signature in presence of two witnesses.

PATRICK D. LAWLOR. [L. S.]

Witnesses:
RALPH T. PARKER,
MARY E. HEGARTY.